United States Patent Office 3,575,953
Patented Apr. 20, 1971

3,575,953
SULPHUR DYESTUFFS
Djavad Razavi, Paris, France, assignor to
Ugine Kuhlmann, Paris, France
No Drawing. Filed May 15, 1968, Ser. No. 729,369
Claims priority, application France, May 17, 1967,
106,643
Int. Cl. C09b 49/06, 49/12
U.S. Cl. 260—128                                    1 Claim

ABSTRACT OF THE DISCLOSURE

A sulphur dyestuff which comprises treating a phthalocyanine which is free from amino groups, a dioxazine, an anthraquinone derivative or substituted or unsubstituted polycyclic aromatic hydrocarbon, in solution or suspension in sulphur chloride, with chlorosulphonic acid at a temperature between 90° C. and 200° C. inclusive. The dyestuffs are useful for the dyeing of cellulosic fibres.

The present invention relates to new sulphur dyestuffs and a process for their preparation.

Sulphur dyestuffs can be obtained from polyaminophthalocyanines by the action of chlorosulphonic acid and sulphur chloride on these compounds. Such a process is described in German Pat. No. 1,062,852 and its patent of Addition No. 1,067,154. Sulphur dyestuffs are also obtained by treating dioxazine dyestuffs and aromatic hydrocarbons with complexes of aluminium chloride and sulphur chloride. This process is the subject of U.S. Pat. No. 2,504,135.

According to the present invention, it has been found that by treating phthalocyanine dyestuffs not containing amino groups, dioxazine dyestuffs, anthraquinone dyestuffs or substituted or unsubstituted polycyclic aromatic hydrocarbons, in suspension or in solution in sulphur chloride, with chlorosulphonic acid at a temperature between 90° C. and 200° C., preferably between 100° C. and 150° C., sulphur dyestuffs are obtained which differ from the products obtained by the above mentioned processes by a greater tinctorial yield and purer shades. The process of the invention is much simpler than the above mentioned processes and avoids the removal of large quantities of sulphur or the use of starting materials which are more difficult to obtain, such as the polyaminophthalocyanines or mixtures capable of producing them during the reaction.

The invention is illustrated by but not limited to the following examples in which the parts are parts by weight unless the contrary is indicated.

EXAMPLE 1

37 parts by volume of chlorosulphonic acid are added over a period of half an hour to a suspension of 12 parts of copper phthalocyanine in 17 parts by volume of sulphur chloride, the mixture is heated up to 95–100° C. over a period of an hour, and kept for four hours at this temperature, then heated up to 140° C. in a quarter of an hour and kept for three quarters of an hour at between 140° C. and 148° C. The mixture is cooled to 100° C., 250 parts of hot water are added, and the solid is filtered off, washed with hot water and dried at 60° C. 20 parts of a deep green powder are obtained which dyes cellulosic fibres, from a bath of alkali metal sulphide according to the technique for sulphur dyestuffs, in a green shade which is fast to light.

EXAMPLE 2

75 parts by volume of chlorosulphonic acid are added in a period of half an hour to a suspension of 12 parts of the dystuff of the formula:

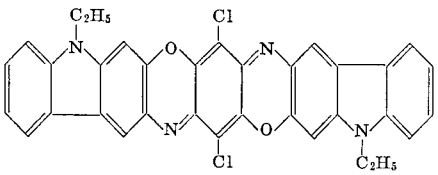

in 23 parts by volume of sulphur chloride, and the mixture is heated up to 100° C. in a period of 3½ hours and maintained at this temperature for 2½ hours. 100 parts of hot water are added, and the solid is filtered off, washed with water and dried at 60° C. 20 parts of a navy blue powder are obtained which dyes cellulosic fibres, from a bath of alkali metal sulphide, in a navy blue shade which is fast to light.

EXAMPLE 3

12 parts of 1,4-diamino-anthraquinone are added to 20 parts by volume of sulphur chloride, and then 45 parts by volume of chlorosulphonic acid are added in a quarter of an hour. The mixture is heated up to 95–98° C. over a period of a quarter of an hour and maintained for 3½ hours at this temperature, then heated up to 148–150° C. over a period of half an hour and maintained at this temperature for about three quarters of an hour. It is allowed to cool to 100° C., and 250 parts of hot water are added. The mixture is stirred for about 20 minutes and the solid is filtered off, washed with hot water and dried at 60° C. 22 parts of a black powder are obtained which dyes cellulosic fibres from an alkali metal sulphide or a hydrosulphite bath in a dark grey shade.

EXAMPLE 4

If the 12 parts of 1,4-diamino-anthraquinone in Example 3 are replaced by 12 parts of 1,5-diamino-anthraquinone, under the same conditions 22 parts of a black powder are obtained which dyes cellulosic fibers from an alkali metal sulphide or hydrosulphite bath in a violet grey shade.

EXAMPLE 5

If the 12 parts of 1,4-diamino-anthraquinone in Example 3 are replaced by 12 parts of quinizarin, 20 parts of a black powder are obtained which dyes cellulosic fibres from an alkali metal sulphide bath in a grey shade.

EXAMPLE 6

12 parts of pyrene are added to 23 parts by volume of sulphur chloride, with external cooling, then 50 parts by volume of chlorosulphonic acid are added in a period of 40 minutes. The mixture is heated up to 95–100° C. over 45 minutes, maintained for 2½ hours at this temperature, then heated up to 115–120° C. and maintained at this temperature for an hour. 100 parts of hot water are added, the mixture is stirred for 10 minutes, and the solid is filtered off, washed with hot water and dried at 60° C. 34 parts of a deep brown powder are obtained which dyes cellulosic fibers, according to the technique for sulphur dyestuffs, in a bright red-brown shade which is fast to light and to washing.

EXAMPLE 7

16 parts of tetrachloropyrene are added to 20 parts by volume of sulphur chloride and then 45 parts by volume of chlorosulphonic acid are added over 20 minutes. The mixture is heated up to 100° C. in a period of an hour, maintained for 2½ hours at this temperature, then heated up to 140° C. in a period of 20 minutes and maintained for 2 hours at this temperature. 100 parts of hot water are added, the product is stirred for 10 minutes, then the solid is filtered off, washed with hot water and dried at 60° C. 28 parts of a deep brown powder are obtained which dyes cellulosic fibers, from a reducing bath, in a red-brown shade which is fast to washing and to light.

EXAMPLE 8

12 parts of finely ground β-naphthol are added to 20 parts by volume of sulphur chloride with external cooling. After stirring for about 10 minutes and the ceasing of the frothing, 45 parts by volume of chloro-sulphonic acid are introduced in a period of 20 minutes. The mixture is heated up to 95–98° C. over a period of 1½ hours, maintained for 4 hours at this temperature, then heated up to 145° C. in a period of three quarters of an hour and maintained for about an hour and a quarter at this temperature. It is cooled to 100° C., 200 parts of hot water are added, and the solid is filtered off, washed with hot water and dried at 60° C. 29.5 parts of a dyestuff are obtained which dyes cellulosic fibers from a reducing bath in a catechu shade.

I claim:
1. Sulphur dyestuff obtained by treating copper phthalocyanine which is free from amino groups, a dioxazine dyestuff, an amino-or hydroxy-substituted anthraquinone, pyrene, chloro-substituted pyrene or naphthol, which compound is in solution or suspension in two to five times its weight of sulphur chloride, with four to nine times its weight of chlorosulphonic acid at a temperature between 90° C. and 200° C. inclusive.

References Cited

UNITED STATES PATENTS 2,768,998   10/1956   Schwamberger _____ 260—131

FOREIGN PATENTS 1,062,852   1/1960   Germany _____ 260—131
1,067,154   4/1960   Germany _____ 260—131

CHARLES B. PARKER, Primary Examiner

D. R. PHILLIPS, Assistant Examiner

U.S. Cl. X.R.

8—37, 54.2; 260—129, 131, 139